United States Patent
Flanagan

[11] 3,880,461
[45] Apr. 29, 1975

[54] WINDSHIELD HEAT REFLECTOR

[76] Inventor: George Paul Flanagan, 5223 Bonnie View Rd., Dallas, Tex. 75241

[22] Filed: July 2, 1973

[21] Appl. No.: 375,320

[52] U.S. Cl............ 296/95 C; 296/97 E; 296/97 G
[51] Int. Cl............................................. B60j 3/02
[58] Field of Search .... 296/95 C, 97 E, 97 G, 97 C; 40/124.1; 161/220

[56] References Cited
UNITED STATES PATENTS

| | | | |
|---|---|---|---|
| 1,628,704 | 5/1927 | Zartman | 296/97 G |
| 2,029,158 | 1/1936 | Clarke | 40/124.1 |
| 2,922,676 | 1/1960 | Czajkowski | 296/97 G |
| 2,991,119 | 4/1961 | Young | 296/97 E |
| 3,716,441 | 2/1973 | Black et al. | 161/220 X |

FOREIGN PATENTS OR APPLICATIONS 1,332,703  6/1963  France ............... 296/95 C Primary Examiner—Stanley H. Tollberg
Assistant Examiner—John P. Shannon
Attorney, Agent, or Firm—Howard I. Podell

[57] ABSTRACT

A heat reflective device consisting of lightweight sturdy composition board faced on one side with a non-glare reflective material which is placed inside and against the windshield of a parked motor vehicle so as to reflect the sun's rays and thus prevent excessive heat buildup inside the vehicle.

1 Claim, 4 Drawing Figures

WINDSHIELD HEAT REFLECTOR

SUMMARY OF THE INVENTION

This invention relates to a heat reflective device and particularly to one which may be placed inside the windshield of a parked motor vehicle so as to significantly reduce the heat buildup inside the vehicle due to the sun's rays.

The advantage of this invention is that it makes the vehicle interior cooler and thus more comfortable to enter. In addition, the device saves fuel in air conditioned vehicles because less energy is required to cool the interior, after parking.

A further advantage is that the invention can be used as a signalling device in case of emergency.

The device consists of several pieces of sturdy, lightweight composition or other sheet material faced on one side with a non-glare reflective material such as aluminum foil. These pieces are contoured to approximate the outline of a windshield and are joined together with adjustable overlaps so that the device can be fitted to individual windshields and then locked in shape. There are fold-out angular legs for resting on the inside vehicle dash cowl to provide stability for the device.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
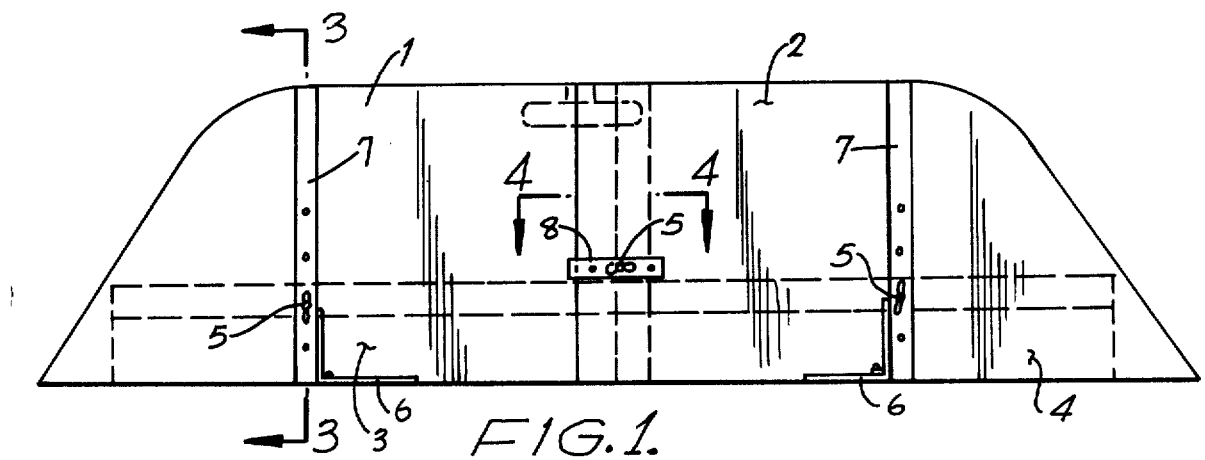
FIG. 1 is an elevation view of the device fully assembled.

Turning now descriptively to the drawings, in which similar reference characters denote similar elements throughout the several views, FIG. 1 illustrates the device fully assembled in use with four pieces, 1, 2, 3 and 4 of reflective sheet material joined together by wing nuts and bolts 5. Reinforcing bars 7 and 8 maintain rigidity and provide bearing for the wing nuts at the joints. The legs 6 are shown in a partially open position.

Figure 2:
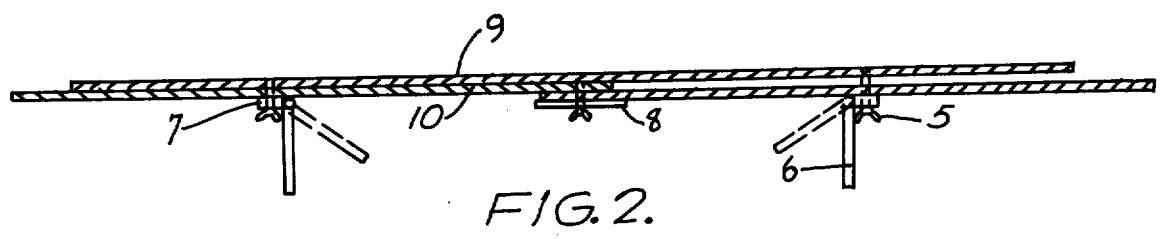
FIG. 2 is a plan view of the device fully assembled.

As shown in FIG. 2, the reflective surface 9 is bonded to the composition sheet material 10 and faces outward to reflect the sun's rays and heat. Also shown are legs 6 which can be adjusted to suit the configuration of the dashboard top.

Figures 3, 4:
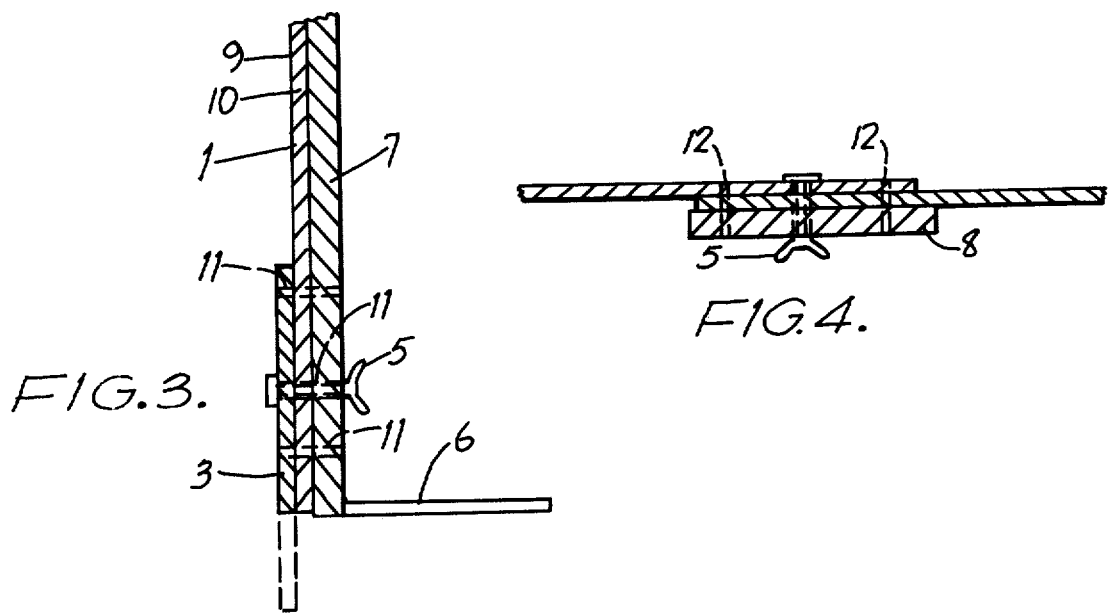
FIG. 3 is a partial vertical sectional view showing the horizontal lap joint.
FIG. 4 is a partial horizontal sectional view showing the vertical lap joint.

In FIG. 3 the adjustable horizontal lap joint is shown with the bolt and wing nut 5 holding the reflective sheet materials 1 and 3 and reinforcing bar 7 together. Several holes at 11 are shown which can be used to adjust the vertical size of the device by relocating the bolt and wing nut 5.

FIG. 4 illustrates the vertical lap joint with reinforcing bar 8 held together by bolt and wing nut 5. Holes 12 are provided for adjusting the horizontal length of the device.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A heat reflective device for the protection of a parked vehicle consisting of a composition sheet material faced on one surface with heat and light reflective material, said device shaped to approximate the outline of the windshield and to fit inside and against the windshield of a parked motor vehicle so as to reflect the heat rays of the sun out of the vehicle and thus prevent the buildup of heat inside the vehicle, said device comprising sheets of laminate of a backing of composition sheet material faced on one side with aluminum foil, with the several sheets of the laminate slidably joined together in overlapping fashion, with means to fix adjacent sheets in a given position relative to each other, and with foldout legs fastened to the composition material for furnishing upright support to the device when resting on a cowl behind a windshield of a vehicle.

* * * * *